United States Patent [19]

Petersson et al.

[11] Patent Number: 4,614,905

[45] Date of Patent: Sep. 30, 1986

[54] CHARGING REGULATOR

[75] Inventors: Bo A. O. Petersson, Hägersten; Leif T. Hansson, Rönninge; Per-Edward Samsioe, Sollentuna, all of Sweden

[73] Assignee: Telefonaktiebolaget LM Ericsson, Stockholm, Sweden

[21] Appl. No.: 616,211

[22] PCT Filed: Oct. 10, 1983

[86] PCT No.: PCT/SE83/00350

§ 371 Date: May 18, 1984

§ 102(e) Date: May 18, 1984

[87] PCT Pub. No.: WO84/01675

PCT Pub. Date: Apr. 26, 1984

[30] Foreign Application Priority Data

Oct. 12, 1982 [SE] Sweden .............................. 8205797

[51] Int. Cl.[4] .............................................. H02J 7/08

[52] U.S. Cl. ........................................ 320/18; 320/23; 320/39

[58] Field of Search ........................................ 320/2-5, 320/15-18, 35, 37, 38, 39

[56] References Cited

U.S. PATENT DOCUMENTS

| | | | |
|---|---|---|---|
| 3,221,239 | 11/1965 | Langier et al. | 320/17 |
| 3,237,078 | 2/1966 | Mallory | 320/17 |
| 3,305,754 | 2/1967 | Oaks et al. | 320/18 X |
| 3,917,990 | 11/1975 | Sherman, Jr. | 320/35 |
| 4,061,955 | 12/1977 | Thomas et al. | 320/18 X |
| 4,238,721 | 12/1980 | DeLuca et al. | 320/18 |

*Primary Examiner*—R. J. Hickey

*Attorney, Agent, or Firm*—Roberts, Spiecens & Cohen

[57] ABSTRACT

An autonomous regulator for regulating the charging current to the individual cells in a battery. The regulator shunts the portion of the trickle current which constitutes an excess to the charging current. There is thus provided an optimum charge for each cell, independent of differences in self-discharge of the different cells. The size of the shunted current is determined by the difference between the cell pole voltage and a reference voltage generated in the regulator.

7 Claims, 2 Drawing Figures

11
5
4
2
$I_1$
$I_3$
$I_2$
9
13
14
15
7
6
12
10
1
3

$I_3$ mA
300
200
100
$U_c$ V
2,20
2,25

CHARGING REGULATOR

FIELD OF THE INVENTION

The invention relates to a regulator for regulating the charging current in individual cells in a battery. The regulator is essentially intended for use with stationary batteries in continuous operation.

BACKGROUND

In a battery consisting of a plurality of cells, the self-discharge of the individual cells is a problem, since the self-discharge current can vary heavily from cell to cell. The trickle charge supplied to the battery must be at least as large as the greatest self-discharge current to avoid some particular cell from being discharged after a time. If the same current goes through all the cells, cells with low self-discharge will get a charging current which is too large, resulting in overvoltage in these cells. An overvoltage has, inter alia, the following drawbacks.

(1) It results in troublesome variation in the voltage of the individual cells.
(2) It negatively affects the lifetime of a cell.
(3) It results in the generation of gas in the cell.
(4) The risk of injurious excess pressure is increased with respect to hermetically sealed cells.
(5) Water consumtion increases in open cells.

A known techique for tailoring the trickle current to the requirement of the individual cell is to connect a resistor in parallel with each cell, this resistor having a resistance which is so low that the current through it is considerably larger than the largest self-discharge current. Each cell will thus be charged up to the same pole (terminal) voltage. A disadvantage with this method is that if there is an interruption in the charging current, the battery will be discharged across these resistors with troublesome rapidity. Another disadvantage is that the energy consumption in the resistors is very high during normal operation. Another known technique is to use series-connected diodes instead of resistors. The disadvantage with battery discharge when the charge current is interrupted is thus elimintated. A problem with this technique is that variations in the characteristic of the diodes are not compensated, and thus only a modest regulating effect is obtained.

SUMMARY OF THE INVENTION

An object of the present invention is to regulate individually the charging current to the cells included in a battery, with the aid of a regulator connected to each cell and utilizing the cell to which it is connected as a power source, thus the cell and the regulator constitute an autonomous unit.

BRIEF DESCRIPTION THE DRAWING

The invention will now be described in detail below with the aid of an embodiment and with reference to the appended drawing, wherein;

FIG. 1 diagrammatically illustrates a circuit diagram for a regulator connected to a cell in a battery connected to a DC source; and FIG. 2 illustrates the voltage-current characteristic for a regulator.

DETAILED DESCRIPTION OF A BEST MODE FOR CARRYING OUT THE INVENTION

Figure 1:
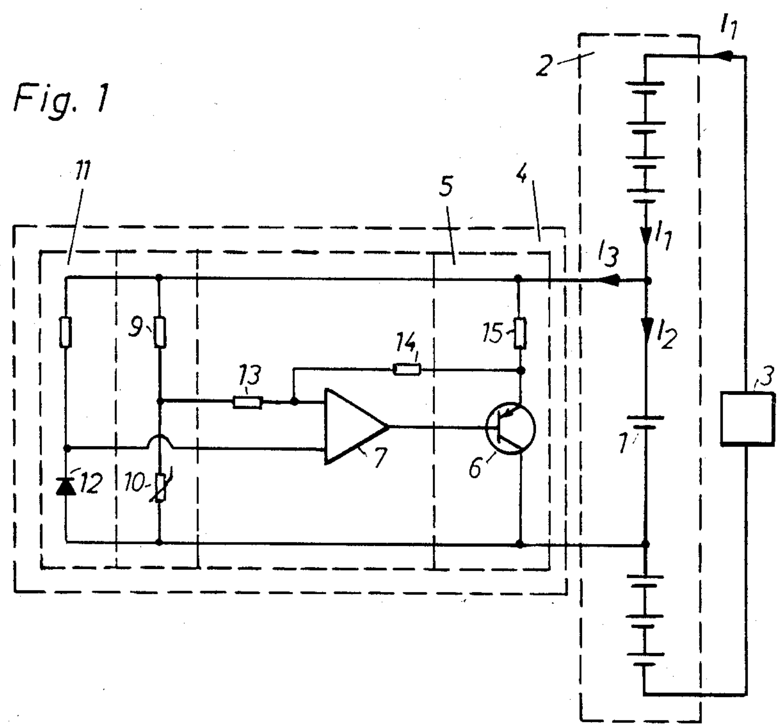

In FIG. 1 numeral 1 denotes a cell in a battery 2 of cells. The battery 2 is charged from a DC unit 3 with a trickle current $I_1$. A regulator 4 is connected to each cell, such that the trickle current $I_1$ is apportioned to a charging current $I_2$ through the cell and a current $I_3$ through the regulator 4. Thus, $I_2 = I_1 - I_3$, for each cell.

The regulator 4 includes an impedance circuit 5, where a resistor 15 and a transistor 6 constitute the resistance of the circuit. The transsistor 6 is controlled by an operational amplifier 7, which controls the resistance across the transistor 6 in response to the difference between the voltages applied to the inputs of the amplifier. One input of the operational amplifier 7 is connected to the voltage from a voltage divider with two resistors 9 and 10 giving a voltage proportional to the pole voltage of the cell 1, and the other input is connected to the voltage from a reference voltage source 11, which includes for example a Zener-diode 12 for determining the value of the reference voltage.

The regulator functions in the following manner. The pole voltage of the cell 1 varies depending on the charge state as well as on the size of the charging current $I_2$. For a pole voltage corresponding to an incompletely charged cell, or a fully charged cell with the trickle current $I_1 = 0$, the difference between the voltage divided pole voltage and the reference voltage affects the operational amplifier 7 such that it excites the transistor 6 to become high-ohmic. For a pole voltage corresponding to a fully charged cell which is passed through by a charging current $I_2$, the discharge current of the cell itself results in the voltage difference on the input of the operational amplifier 7 such that the amplifier excites the transistor 6 to be low-ohmic.

In order to obtain the greatest possible stability of the regulator the operational amplifier 7 and the transistor 6 are commonly loop-connected with the aid of two resistors 13 and 14 and are provided with negative feed-back with the aid of a resistor 15.

Figure 2:
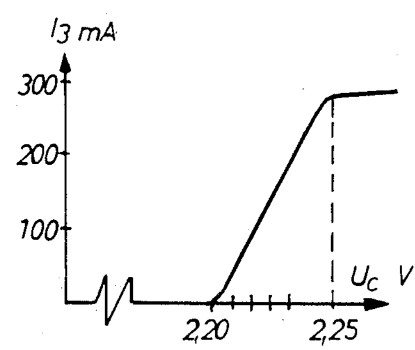

In an embodiment with the following values: Resistor 9 = 15 Kohms, resistor 10 = 10 Kohms, resistor 13 = 10 Kohms, resistor 14 = 180 Kohms and resistor 15 = 3 ohms, a current $I_3$ is obtained at a pole voltage of 2.20 volts of 0.1 mA through the regulator. At a pole voltage of 2.25 volts current $I_3 = 300$ mA is obtained. The regulator 4 in this embodiment has a voltage/current characteristic according to FIG. 2.

A PNP transistor is included in the impedance circuit in the example described above. It is obvious that an NPN transistor may also be used. It is also obvious that the reference voltage source may include an electric cell instead of the Zener-diode.

What is claimed is:

1. A regulator (4) with a shunt circuit (5) for regulating a charge current ($I_2$) to an individual cell (1) in a battery (2) of cells, where the current ($I_2$) constitutes the whole or a part of a trickle current ($I_1$) applied to the battery, characterized in that the regulator includes a bridge connection having its inputs connected in parallel with the shunt circuit to the poles of the cell, one branch of the bridge coupling supplying a constant voltage, and the other branch supplying a voltage proportional to the cell pole voltage, the difference in these two voltages being utilized for continuously regulating the impedance of the shunt circuit, the result of which having a continuous smoothly varying regulation of the charging current ($I_2$) as a function of the cell pole voltage, the regulator obtaining its driving voltage from the cell poles, thus the regulator together with the cell, constitute an autonomous unit, for keeping a constant voltage between the cell poles by means of the applied trickle current ($I_1$).

2. A charging regulator for regulating the charging current fed via a pair of terminals to an individual cell of a battery comprising a first resistor and a transistor connected in series across the pair of terminals of the cell, said transistor having a control input for continuously varying the amplitude of the current passing through the transistor in response to a continuously variable control signal received by said control input, a difference amplifier means having an output connected to said control input and first and second difference inputs, first means for applying a fixed reference voltage to one of said difference inputs and second means for applying a voltage related to the voltage across said pair of terminals whereby a continuously varying difference voltage is applied across said difference inputs as the voltage across said pair of terminals continuously varies.

3. The charging regulator of claim 2 wherein said first means comprises a second resistor and a reference voltage source connected in series across said pair of terminals, said one difference input being connected to the junction of said second resister and said reference voltage source, said second means comprises third and fourth resistors connected in series and said other difference input being connected to the juntion of said third and fourth resistors.

4. The charging regulator of claim 3 wherein said reference voltage source is a Zener diode.

5. The charging regulator of claim 2 wherein said difference amplifier means is an operational amplifier including negative feedback means connected between the junction of said first resistor and transistor and said one difference input.

6. The charging regulator of claim 2 wherein said second means comprises second and third serially connected resistors, and further comprising loop connection means including fourth and fifth serially connected resistors connected between the junction of said second and third resistors and the junction of said first resistor and said transistor and said other difference input being connected to the junction of said fourth and fifth resistors.

7. The charging regulator of claim 6 wherein said first means comprises a sixth resistor and a Zener diode connected in series and said one difference input being connected to the junction of said sixth resistor and said Zener diode.

* * * * *